United States Patent
Tayloe et al.

(10) Patent No.: US 7,224,994 B2
(45) Date of Patent: May 29, 2007

(54) POWER CONTROL METHOD FOR HANDLING FRAME ERASURE OF DATA IN MOBILE LINKS IN A MOBILE TELECOMMUNICATION SYSTEM

(75) Inventors: Daniel R. Tayloe, Phoenix, AZ (US); Mark T Pflum, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 610 days.

(21) Appl. No.: 10/463,899

(22) Filed: Jun. 18, 2003

(65) Prior Publication Data

US 2004/0259582 A1    Dec. 23, 2004

(51) Int. Cl.
*H04B 7/00* (2006.01)
*H04Q 7/20* (2006.01)

(52) U.S. Cl. .............. 455/522; 455/13.4; 455/69; 455/127.1; 455/420; 455/436; 455/504; 370/311; 370/318; 370/320; 370/342

(58) Field of Classification Search ............ 455/522, 455/13.4, 504, 68, 505, 69, 506, 127.1, 343.1, 455/420, 436, 440, 441, 442, 443; 370/318, 370/311, 120, 320, 342
See application file for complete search history.

(56) References Cited

U.S. PATENT DOCUMENTS

| 5,220,678 | A  | * | 6/1993  | Feei ............................. 455/69 |
| 5,987,326 | A  | * | 11/1999 | Tiedemann et al. ......... 455/442 |
| 6,023,615 | A  | * | 2/2000  | Bruckert et al. ......... 348/14.08 |
| 6,545,986 | B1 | * | 4/2003  | Stellakis ..................... 370/318 |
| 6,587,442 | B1 | * | 7/2003  | Tripathi ..................... 370/311 |
| 6,876,866 | B1 | * | 4/2005  | Ulupinar et al. ............ 455/522 |
| 2003/0092463 | A1 | * | 5/2003 | Charriere et al. ........... 455/522 |

* cited by examiner

*Primary Examiner*—Matthew Anderson
*Assistant Examiner*—Shaima Q. Aminzay

(57) ABSTRACT

A method for substantially reducing the frame erasure rate (FER) to approximately 1 percent dynamically changes the power down to power up ratio from 100 to 1 to 200 to 1 to minimize subsequent frame erasures. During call startup periods the method (60) loosely monitors the power. Whereas for consecutive error bursts of frame erasures, the process (80) does not change the power threshold. This power threshold is the level received signals are compared against to determine if a power up or a power down step needs to be performed. Likewise, RF fades will not cause the power threshold to be increased. Further, should the power threshold exceed its maximum, it is reset by process (90).

3 Claims, 4 Drawing Sheets

POWER CONTROL METHOD FOR HANDLING FRAME ERASURE OF DATA IN MOBILE LINKS IN A MOBILE TELECOMMUNICATION SYSTEM

BACKGROUND OF THE INVENTION

The present invention pertains to power control in a mobile telecommunication system and more particularly to power control of the links between the base station and the mobile station.

Mobile telecommunication systems include wireless links between mobile stations, which may be mobile telephones, pagers, computers, etc., and the base station of the mobile telecommunication system. Since these links are wireless, the links are susceptible to noise and interference with other signals. The signals received at the mobile station or received at the base station may "fade". That is, the data signals received by the mobile station or by the base station may become much more attenuated than the surrounding noise and other interference.

The quality of wireless telecommunications is often measured by the ability of the mobile stations and the base station to receive accurate and clear data. As fading of a signal is detected, the base station or the mobile station of the mobile telecommunication system may increase the transmission power it is using to reach the entity at the other end of the link. Further, if the received data signal is not subject to fading the base station or mobile station may decrease the power with which the data is transmitted to the entity at the other end of the link.

When greater power is used on a particular wireless link, this increase in power increases the interference for the other links connecting other mobile stations to the base station.

In a code division multiple access (CDMA) mobile telecommunication system, power control bits are continuously sent, approximately every 1.25 milliseconds, requesting that the entity on the other end of the link to power up by one step or power down by one step. That is, each mobile station continuously sends power control bits (PCB) to the base station, requesting that the base station transmit with greater power since the data signal is fading.

A frame erasure rate (FER), particularly for the reverse channel, i.e., the channel transmitting from a mobile station to a base station, is expected to be at a frame erasure rate of 1 percent. However, current reverse channel control methodology produces a frame erasure rate closer to 2 percent. Current outer loop power control methods provide for these relatively high frame erasure rates. The outer loop power control adjusts power control signal to interference ratio power thresholds used to distinguish between needing to power up and down the mobile station. Generally, these methods increase the power threshold whenever an erroneous frame is received and reduce the power threshold when a good frame is received. This current methodology does not compensate for large bursts of errors such as is typical under actual conditions. As a result, the frame erasure rate is normally considerably higher than 1 percent.

Accordingly, it would be highly desirable to have a power control method which lowers the frame erasure rate (FER) on both the reverse and forward links of a mobile station.

BRIEF SUMMARY OF THE INVENTION

The present invention provides a power control method for either a mobile station (e.g., a pager, mobile telephone or computer) or a base station in a mobile telecommunication system, such as a code division multiple access (CDMA) mobile telecommunication system. In accordance with one aspect of the present invention there is provided a power control method which includes the steps of determining whether a frame erasure of data occurred during a call and, if no frame erasure occurred, decreasing a power threshold by a first percentage of a full power modification step to a lower power threshold if no frame erasure occurred, maintaining the lower power threshold for a predetermined time, and ten decreasing the lower power threshold by a second percentage of the full power modification step, the second percentage being greater than the first percentage.

In accordance with another aspect there is provided a power control method including the steps of determining whether a frame erasure of data occurred during a call and, if a frame erasure occurred, determining whether the state of the call when the frame erasure occurred is (a) a call start up condition, (b) a radio frequency (RF) fade condition, or (c) a frame erasure burst condition. A call start up condition is a predetermined call startup time interval at the beginning of the call. A RF fade condition is detection of more than a predetermined number of power increases during the frame in which the frame erasure occurred. And a frame erasure burst condition is determined in response to the frame erasure of data occurring in a frame closely subsequent to a previous frame in which a frame erasure of data occurred.

In accordance with yet another aspect of the present invention there is provided a power control method including the steps of determining whether a frame erasure of data occurred during a call. If no frame erasure occurred, a power threshold is decreased by a first percentage of a full power modification step to a lower power threshold and, if a frame erasure occurred, the power threshold is increased by the full power modification step to a higher power threshold. If the higher power threshold is at or above a maximum limit, the power threshold is set to the maximum level.

DESCRIPTION OF THE PREFERRED EMBODIMENT OF THE INVENTION

Figure 1:
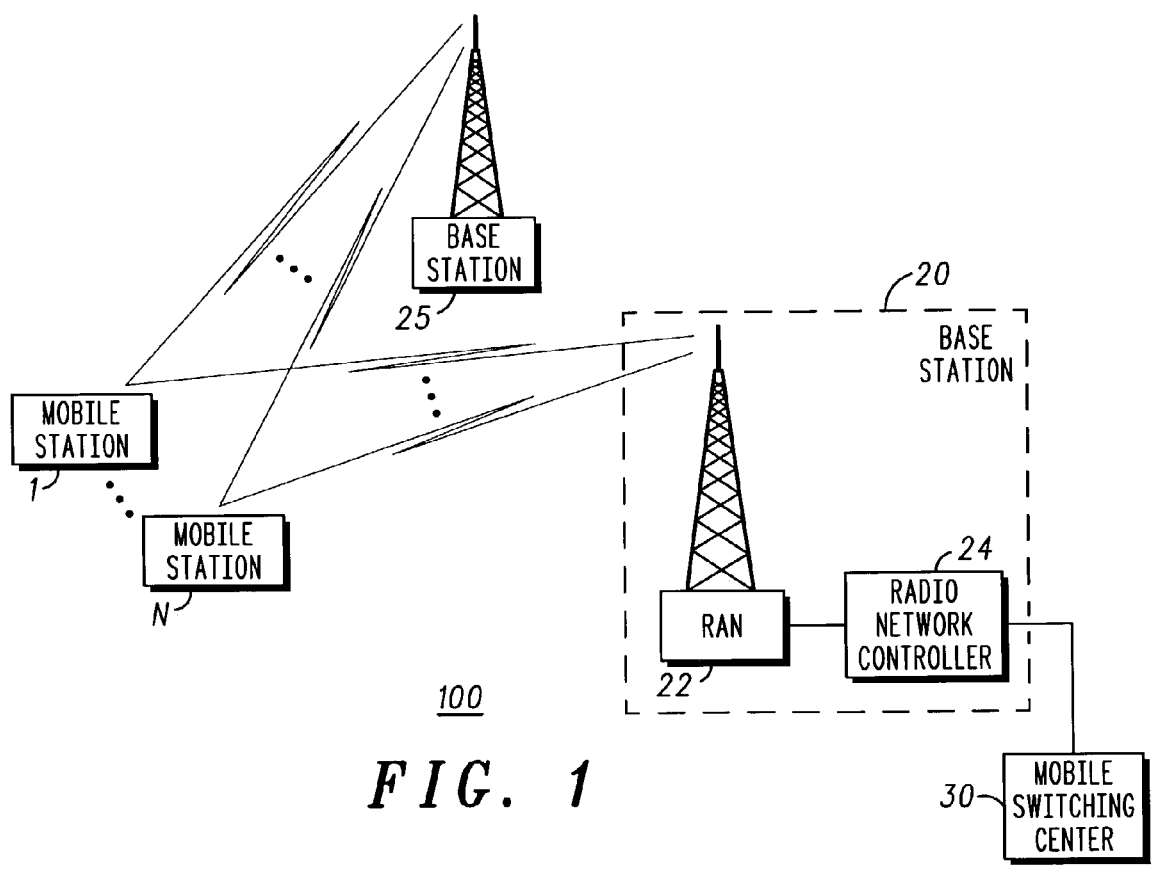
FIG. 1 is a block diagram of a mobile telecommunication system in accordance with the present invention.

FIG. 1 is a block diagram depicting a mobile telecommunication system 100. Mobile telecommunication system 100 includes mobile network equipment 20, 25 and 30 and mobile stations 1–N. The mobile network equipment or communication infrastructure includes base stations 20 and 25 and mobile switching center 30, for example. A typical base station 20 includes a radio access network (RAN) 22 and a radio network controller (RNC) 24. Radio network controller 24 is coupled to the mobile switching center 30.

Each mobile station 1–N is coupled to RAN 22 of base station 20 via a mobile link. These mobile links include a forward channel which is the base station 20 transmitting to the mobile station 1, for example, and a reverse channel which is the mobile station 1 transmitting to base station 20.

One or more base stations 25 may also provide wireless data links coupling mobile stations 1–N in order to provide for constant communication by transmitting the same data to the mobile stations.

The base stations 20–25 control the power with which the mobile stations 1–N send data on the reverse link. Similarly, mobile stations 1–N control the power of signals transmitted by base stations 20, 25 for data transmitted on the forward link.

The power transmitted by mobile stations 1–N is of critical importance since this power is typically supplied by batteries. Transmit power is controlled on both the forward and reverse channels. That is, the base station controls the power at which the mobile station transmits data to the base station and the mobile station controls the power at which the base station transmits data to the mobile station. The following power control method will be explained for the base station controlling the power used by the mobile station to transmit; however, it is noted that the power control method may also be employed within the mobile station for controlling the power transmitted by the base station on the forward link.

Figure 2:
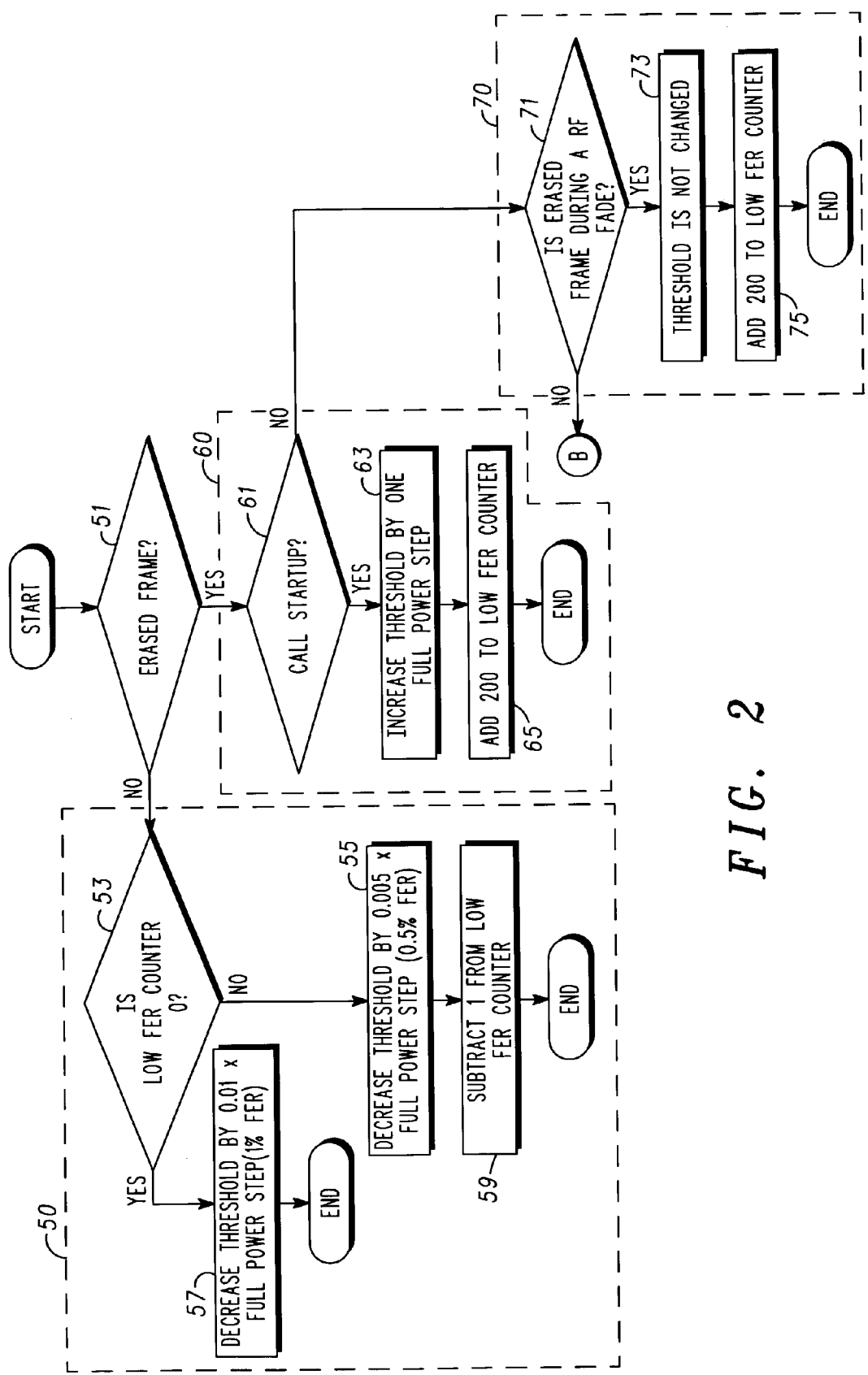
FIGS. 2 and 3 are is a flow charts of a power control method in accordance with the present invention.
Figure 3:
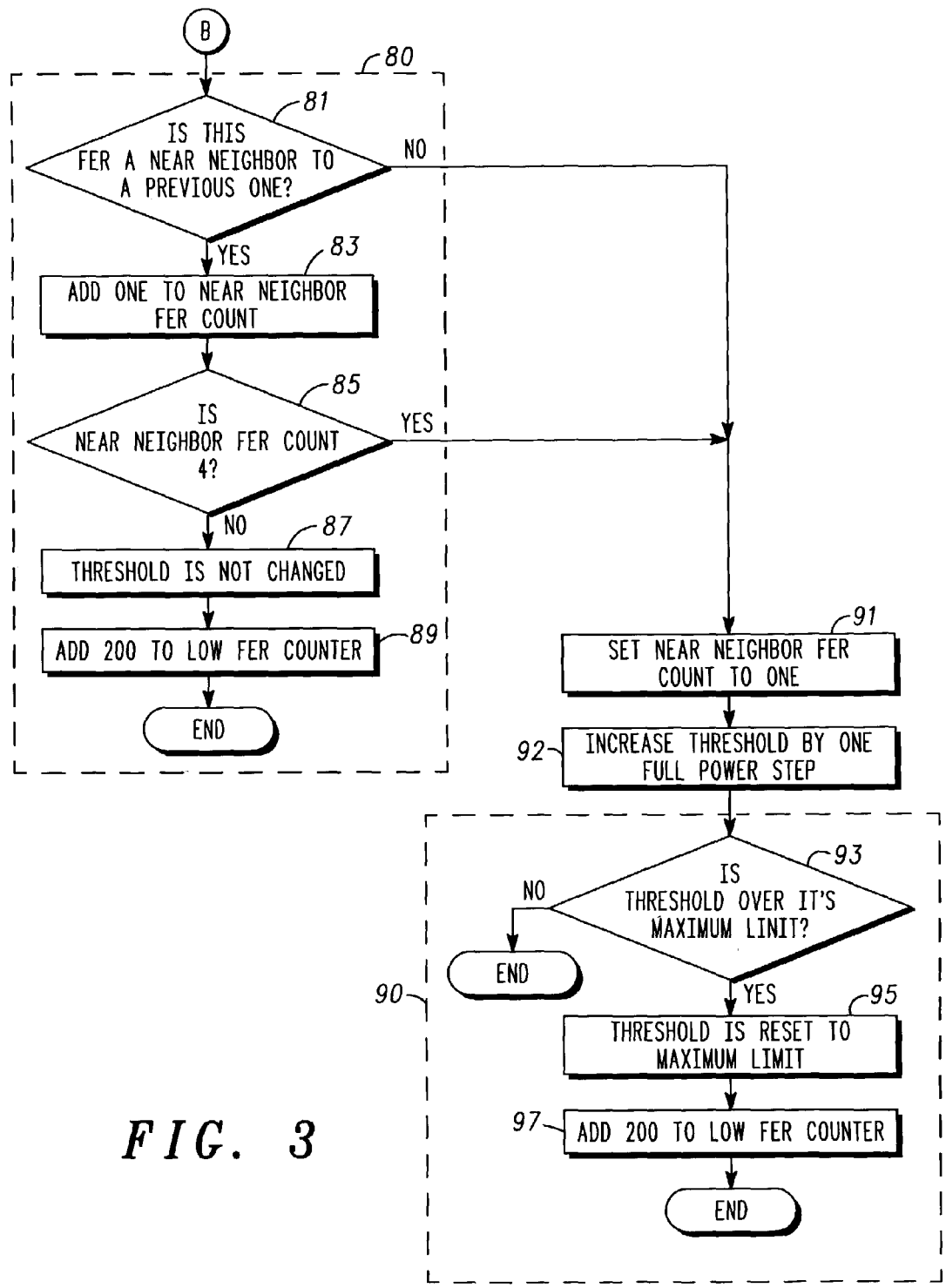

Turning now to FIGS. 2 and 3, a flow chart of the power control method is shown.

Process 50 changes the FER target from the nominal FER target to a lower FER target for a period of time for the purpose of bringing the actual FER in line with the desired target FER. First, block 51 determines whether the received frame was in error or an erased frame. If no error was detected, i.e., a good frame was received, block 51 transfers control to block 53 of process 50 via the no path. Block 53 determines whether the frame erasure rate (FER) counter is zero. If the frame erasure rate counter is zero, the target FER is assumed to be on track for 1% FER and block 53 transfers control to block 57 via the yes path. Block 57 decreases the power threshold by 0.01 of the full power step. That is, the power threshold is decreased by one percent. Then the process is ended.

If the frame erasure rate counter is not zero, which implies the current FER is projected higher than the targeted 1% FER, then block 53 transfers control to block 55 via the no path. Block 55 decreases the power threshold by 0.005 of a full power step. That is, block 55 decreases the power threshold by one half of one percent thereby changing the slope or the rate of decrease of the power threshold. This has the effect of changing the FER target to 0.5% in order to try to bring the current higher than desired FER down to the targeted 1% value. Next, block 59 subtracts one from the low frame erasure rate counter. Then the process is ended.

If block 51 determined that there had been an erased frame or error, block 51 transfers control to block 61 of process 60 via the yes path. Process 60 is performed during the first second of a call. While minimizing the effect of a burst of errors by minimizing the threshold increases during the main portion of a call, during the beginning of a call, the initial threshold setting estimate may be considerably too low. Therefore, for the first second, every erased frame increases the threshold in order to get faster convergence to the proper setting of the threshold.

Block 61 determines whether the call to the mobile station is currently in the call startup mode. If it is, block 61 transfers control to block 63 via the yes path. The call startup mode is defined as approximately one second at the beginning of the call or approximately 50 frames of information transmitted between the mobile station and the base station.

Since there has been a frame erasure, block 63 increases the power threshold by one full power step. As a result even closely packed error bursts or frame erasures will cause full power step-ups during the call startup process. Next, block 65 adds 200 to the low FER counter, reducing the expected FER to 0.5% for the next two seconds (200 frames), as even a single error in the first one second of a call (50 frames) will cause the FER to be at least 2%, which is higher than the desired 1% target. Then the process is ended.

If the call between base station and mobile station is not in the startup mode, block 61 transfers control to block 71 via the no path to start RF fade process 70. If the mobile station 1–N is detected as being in fade such that its desired signal at the base station 20 is measured as constantly being below the desired threshold, and a frame erasure occurs, there is no point to increasing the threshold, since the mobile is below that point already. Therefore, raising the threshold will simply serve to raise the mobile station's power when it finally does come out of the fade and so waste power. To compensate for the fact that the threshold is not raised and still maintain the desired target FER, process 50 then changes to a lower FER target for a time to compensate back to the desired FER.

Block 71 determines whether an error fade has occurred for the present frame of received data. There are 16 power control decisions transmitted for each received frame. An error fade in this embodiment is defined as 15 or more power step ups out of the 16 transmitted power control decisions and a frame erasure still resulting. The many power up commands (15 or more out of 16) imply that the received signal was below the current received power threshold, thus, further increasing the power threshold will be of no avail. Therefore if block 71 determines that this erasure occurred during an RF fade condition, block 71 transfers control to block 73 which does not change the power threshold for this channel. Next, block 75 adds 200 to the low FER counter, so that this error can be offset to a net 1% FER rate by running at a 0.5% FER rate for the next 200 frames. Then the process is ended. In this way, the power threshold is not increased when it is not needed. This in turn will avoid raising the mobile to an excessively high power when it does recover from the temporary fade. This saves mobile power, extends battery life, and reduces interference in the system. If this frame is not experiencing an RF fade condition, block 71 transfers control to block 81 via the no path.

Process 80 is then initiated. Process 80 handles burst errors. In a prior art outer loop threshold process, the threshold is increased for every erased frame that is received. However, when a burst of errors are received, due to interference or such events, the threshold is always raised for the first FER in a burst, but not for most of the successive near neighbor bursts that follow. Process 80 of the preferred embodiment raises the threshold on every fourth error of a burst. Since bursts of errors are common, and it can take some time to respond to the first burst, it is advantageous to not raise the threshold for each erased frame. When the error burst stops, minimizing the step ups will minimize the excess power that the mobile will be forced to use. To compensate for the fact that the threshold was not raised for every FER that was received, concept process 50 changes the mobile station's power to a lower FER target for a time to obtain the desired FER.

Block 81 determines whether this frame erasure is a near neighbor to a previous frame erasure. In the current embodiment, a near neighbor is defined as consecutive frames on a particular channel which experience a frame erasure. However, an alternative embodiment could allow near neighbor erasures to be separated by one or more good frames. If this frame erasure is a consecutive one then block 81 transfers control to block 83 via the yes path. Block 83 adds one to the near neighbor FER count. This indicates that there is at least one consecutive frame erasure for this channel.

Next, block 85 determines whether the near neighbor FER count is equal to four. This counter is used to minimize the effect of a burst of erased frames. In an RF environment, fades often cause bursts of errors. Because this is assumed to be a short duration fade or temporary interference, the power threshold is not raised until four near neighbor erasures in a row are determined. This again saves power by resisting upward power threshold increases for temporary burst conditions. If the near neighbor FER count does not equal four, which indicates that it is three or less, block 85 transfers control to block 87 via the no path. Block 87 does not change the power threshold for this channel. Next, block 89 adds 200 to the low FER counter. Adding 200 to the low FER counter indicates that the downward power steps will be one half of one percent instead of the typical one percent. This changes the rate at which power is turned down in order to avoid subsequent frame erasure bursts and to correct the net frame erasure rate back down to 1% overall. Process 80 is then ended.

If block 81 determines that this particular frame erasure is not a "near neighbor" to a previous frame erasure, block 81 transfers control to block 91. In addition, if block 85 determines that the near neighbor frame erasure (FER) count is equal to four, block 85 transfers control to block 91 via the yes path. Block 91 sets the near neighbor FER count back to one. In other words, for a burst of frame erasures, the power threshold is not increased by a full power step until a predetermined number of consecutive frame erasures is reached. Here the consecutive number of frame erasures is set to be equal to four. However, this parameter may be adjusted as determined by system requirements. Block 92 increases the power threshold by one full power step.

Then process 90 is entered. Since the maximum power limit cannot be exceeded this maximum limit further increasing the threshold, process 90 maintains the FER target by using process 50 to lower the target FER rate for a time to try to maintain the desired target FER.

Block 93 determines whether the power threshold is at or over the maximum limit. If the power threshold is not at its maximum limit, then process 90 is ended.

If the power threshold is over its maximum limit, block 93 transfers control to block 95 via the yes path. Since the power threshold power may not be continuously increased without limit, block 95 resets the power threshold to its maximum limit. Then, block 97 adds 200 to the low FER counter. This has the effect of making power down slopes one half of one percent of the power up increase amount instead of one percent as is the common practice and to correct the net frame erasure rate back down to 1% overall. The process is then ended.

Figure 4:
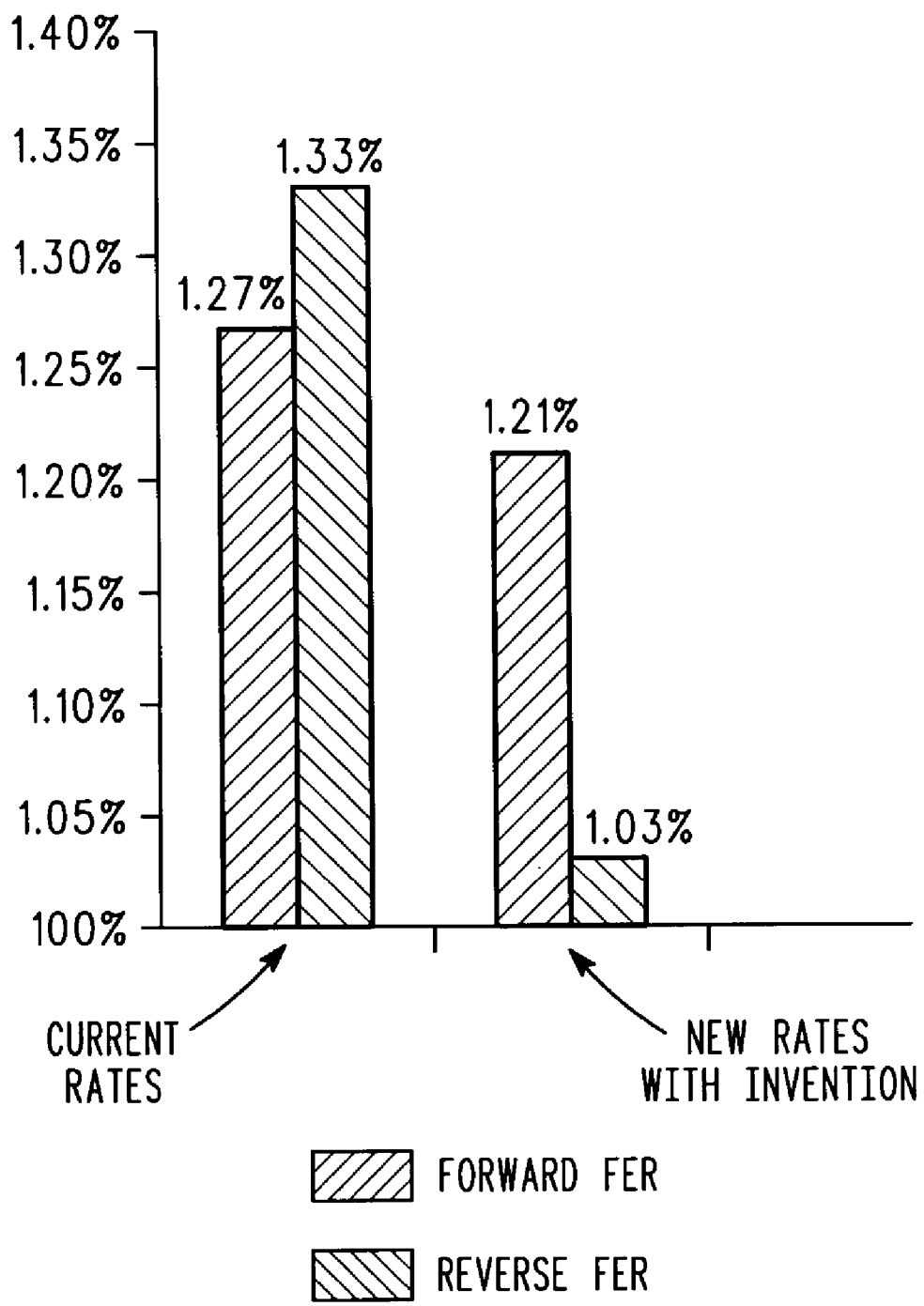
FIG. 4 is a diagram of the frame erasure rate (FER) without and with the present invention.

Next, referring to FIG. 4, a performance bar chart diagram is shown. The results are for simulation testing using a moderately heavy load of mobile station traffic. As can be seen from the chart, the current FER rates are shown on the left. These rates are measured without the present invention. The forward rate is approximately 1.27 percent frame erasure in the forward direction, that is from the base station to the mobile station. The reverse frame erasure rate is approximately 1.33 percent, that is the frame erasure rate for data transmitted from the mobile station to the base station.

The forward and reverse frame erasure rates with the invention are shown on the right of the diagram. The forward frame erasure rate has been lowered slightly from 1.27 percent to 1.21 percent. However, the reverse frame erasure rate has been substantially lowered from 1.33 percent to approximately 1.03 percent with the methodology of the present invention as discussed above. Thus, the target of approximately 1 percent frame erasure rate has been achieved by this invention.

This invention although shown for primarily its robustness in achieving a 1 percent frame erasure rate for the reverse link, is suitable for use on the forward link as well and provides lower frame erasure rates for CDMA base station equipment as well as mobile stations. The present invention, as explained above, leads to a substantially lower and approximately 1 percent frame erasure rate while minimizing the required power for transmission. Current outer loop power control methods provide up to a 2 percent frame erasure rate as measured in the field. With the present invention the outer loop power control method provides approximately a 1 percent frame erasure rate under static conditions.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a mobile telecommunication system, a power control method for a first entity comprising the steps of:
   determining by the first entity whether a frame erasure of data occurred during a call between the first entity and a second entity;
   if a frame erasure occurred, determining by the first entity whether there is a frame erasure burst condition in response to the frame erasure of data occurring in a frame closely subsequent to a previous frame in which a frame erasure of data occurred; and
   if there is a frame erasure burst condition, changing the power threshold every fourth frame in which a frame erasure of data occurs during the frame erasure burst condition.

2. In a mobile telecommunication system, a power control method for a base station comprising the steps of:
   determining by the base station whether a frame erasure of data occurred in a frame during a call between the base station and a mobile station; and
   if a frame erasure occurred, determining by the base station whether there is a radio frequency (RF) fade condition in response to detecting more than a predetermined number of power increases by the mobile station during the frame in which the frame erasure occurred, wherein the frame includes sixteen power decisions by the mobile station, and wherein the predetermined number of power increases is fourteen.

3. In a mobile telecommunication system, a power control method for a mobile station comprising the steps of:
   determining by the mobile station whether a frame erasure of data occurred in a frame during a call between the mobile station anti a base station; and
   if a frame erasure occurred, determining by the mobile station whether there is a radio frequency (RE) fade condition in response to detecting more than a predetermined number of power increases by the base station during the frame in which the frame erasure occurred, wherein the frame includes sixteen power decisions by the base station, and wherein the predetermined number of power increases is fourteen.

* * * * *